United States Patent [19]

Tsukiyama et al.

[11] 4,390,461
[45] Jun. 28, 1983

[54] FERRITE ELECTRODE MATERIAL

[75] Inventors: Nobuyoshi Tsukiyama; Ryo Ichige, both of Katsuta, Japan

[73] Assignee: Hitachi, Ltd., Tokyo, Japan

[21] Appl. No.: 250,666

[22] Filed: Apr. 3, 1981

[30] Foreign Application Priority Data

Apr. 4, 1980 [JP] Japan ................... 55-43477

[51] Int. Cl.³ .............................. H01B 1/06
[52] U.S. Cl. .................... 252/519; 252/521; 252/182.1; 429/218; 429/221
[58] Field of Search ............ 252/519, 521, 182.1; 429/218, 221; 204/291, 292, 293; 75/213, 221, 224; 264/61, 65, 66; 29/592 P

[56] References Cited

U.S. PATENT DOCUMENTS

| 3,640,864 | 2/1972 | Robbins et al. | 252/519 |
| 3,836,397 | 9/1974 | Haraman | 429/221 |
| 3,847,603 | 11/1974 | Fukuda | 429/221 |
| 3,849,198 | 11/1974 | Serdel | 429/221 |
| 3,910,796 | 10/1975 | Asahara et al. | 252/519 X |
| 4,042,518 | 8/1977 | Jones | 252/519 X |
| 4,078,120 | 3/1978 | Lindstrom | 252/519 |
| 4,105,530 | 8/1978 | Johnson et al. | 252/519 |
| 4,143,213 | 3/1979 | Jacobson et al. | 439/218 X |
| 4,236,927 | 12/1980 | Bühl et al. | 75/221 X |

*Primary Examiner*—J. L. Barr
*Attorney, Agent, or Firm*—Antonelli, Terry & Wands

[57] ABSTRACT

A ferrite electrode material composed principally of a composition comprising barium oxide and iron oxide and having been calcined with heating in an inert gas atmosphere is excellent in minimizing energy loss and suppressing high-frequency noise.

10 Claims, 4 Drawing Figures

FERRITE ELECTRODE MATERIAL

FIELD OF THE INVENTION

This invention relates to a ferrite electrode material, more particularly to a ferrite electrode material which suffers less energy loss and maintains a high high-frequency attenuation effect when a high-frequency current is applied to the ferrite electrode material.

BACKGROUND OF THE INVENTION

Generally, ferrite is a material represented by the molecular formula $M.Fe_2O_3$ wherein M is principally a divalent metal ion and comprises a single or composite metal. The type of ferrite which is prevalently used today is composite ferrite comprising Mn (manganese), Ni (nickel), Co (cobalt), Fe (iron), Mg (magnesium) and Zn (zinc).

Such ferrite is used for the ferrite electrodes adapted for such applications as corrosion prevention, water treatment, etc., but recently request is rising for a ferrite electrode material which is capable of minimizing energy loss and suppressing high-frequency noise when a high-frequency current is applied to the ferrite electrode in certain uses.

The conventional ferrite electrode material containing the above-said metal elements was unsatisfactory, in regard of properties, to meet said request. The conventional ferrite material comprising said metal elements is either too high or too low in resistivity, too high resistivity resulting in a large energy loss while too low resistivity making it unable to suppress high-frequency noise, and thus the conventional ferrite material was incapable of realizing said both functions, that is, minimized or no energy loss and suppression of high-frequency noise, simultaneously.

SUMMARY OF THE INVENTION

An object of this invention is to provide a ferrite electrode material which is capable of fulfilling said both functions: minimized energy loss and suppression of high-frequency noise simultaneously.

A feature of this invention is to provide a ferrite electrode material having as a major component a composition comprising iron oxide and barium oxide, said composition having been calcined with heating in an inert gas atmosphere.

DETAILED DESCRIPTION OF THE INVENTION

The following is a detailed description of the ferrite electrode material according to this invention.

This invention is characterized by a ferrite electrode material comprising as its principal ingredient a composition containing barium oxide and iron oxide such as represented by the molecular formula $BaO.Fe_2O_3$ prepared by calcining a composition containing iron oxide and barium oxide in an argon gas or nitrogen gas atmosphere.

By way of an exemplification of the invention, there was prepared a ferrite electrode material typified by the molecular formula $(BaO)_{0.8}.(FeO)_{0.2}.(Fe_2O_3)_{1.0}$ by firing iron oxide consisting of FeO with a molar ratio of 0.2 and $Fe_2O_3$ with a molar ratio of 1.0 and barium oxide with a molar ratio of 0.8 in an argon gas atmosphere at a temperature of 1200° C. The argon gas used for the atmosphere was one containing less than 0.01 ppm of oxygen. The ferrite electrode composed of said composition showed a resistivity of $300\Omega.cm$. The resistivity at this level or thereabound allows fulfilling of both functions for minimal energy loss and suppression of high-frequency noise.

This will be explained by citing the conventional ferrite electrodes. Table 1 shows the compositions, in terms of molecular formula and molar ratio, and the calcining atmosphere used for the preparation of the conventional ferrite electrodes and the ferrite electrode according to this invention.

TABLE 1

| Sample No. | Composition (molar rato) | Atmosphere |
|---|---|---|
| 1 | $(FeO)_{1.0}.(Fe_2O_3)_{1.0}$ | Argon gas |
| 2 | $(MnO)_{1.2}.(Fe_2O_3)_{0.8}$ | " |
| 3 | $(MnO)_{1.0}.(Fe_2O_3)_{1.0}$ | " |
| 4 | $(MnO)_{0.8}.(FeO)_{0.2}.(Fe_2O_3)_{1.0}$ | " |
| 5 | $(CoO)_{0.8}.(FeO)_{0.2}.(Fe_2O_3)_{1.0}$ | " |
| 6 | $(ZnO)_{0.8}.(FeO)_{0.2}.(Fe_2O_3)_{1.0}$ | " |
| 7 | $(MgO)_{0.8}.(FeO)_{0.2}.(Fe_2O_3)_{1.0}$ | " |
| 8 | $(NiO)_{0.8}.(FeO)_{0.2}.(Fe_2O_3)_{1.0}$ | " |
| 9 | $(BaO)_{0.8}.(FeO)_{0.2}.(Fe_2O_3)_{1.0}$ | " |

For Sample Nos. 4, 5, 6, 7, 8 and 9, the molar ratios of the respective components were equalized to facilitate the comparison of properties.

Figure 1:
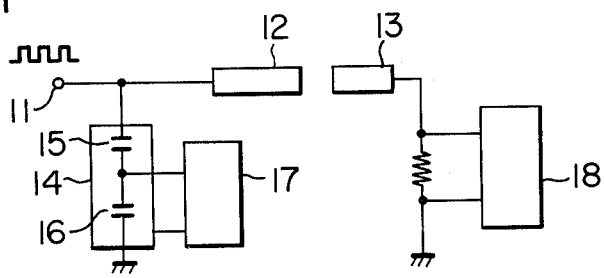
FIG. 1 is a measuring circuit diagram.
Figure 2:
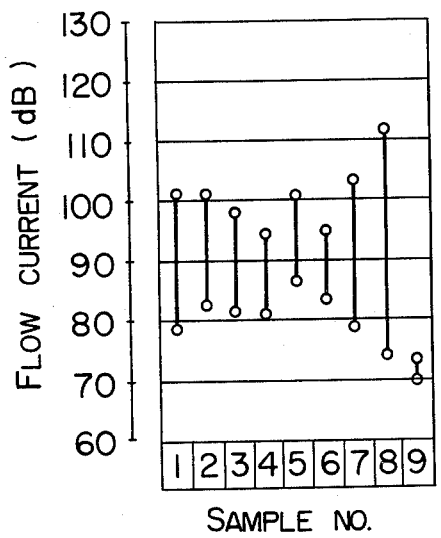
FIG. 2 is a diagram illustrating flow current in the ferrite electrode according to this invention and in the conventional ferrite electrodes.
Figure 3:
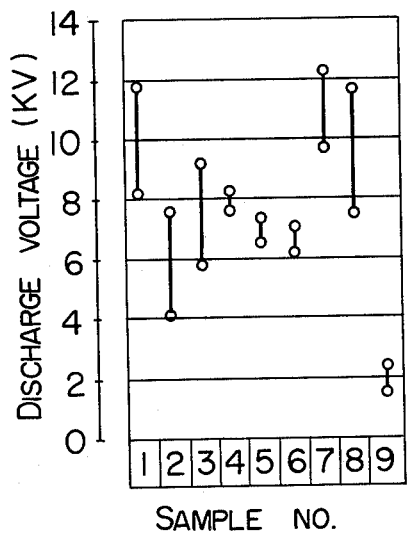
FIG. 3 is a diagram illustrating discharge voltage in the ferrite electrode according to this invention and in the conventional ferrite electrodes.

The discharge voltage and 100 MHz current component during discharge for the respective ferrite electrodes having the above-shown compositions were measured by using a measuring circuit as shown in FIG. 1. In FIG. 1, numeral 11 indicates an input terminal to which a high voltage pulse is supplied, such high voltage pulse being discharged through the test material 12 to another electrode 13 and earthed. Branching off from a halfway point between the input terminal 11 and the test material 12 is an earthed voltage divider 14 to which a voltmeter 17 is connected to measure the discharge voltage. Numerals 15 and 16 denote the capacitors composing the voltage divider 14. Connected between the electrode 13 and the ground is an ammeter 18 for measuring the flow current. The results of measurement of discharge voltage and flow current of each test material by said measuring circuit are shown in FIGS. 2 and 3. All of the test materials were regularized in their dimensions to a length of 35 mm, a width of 5 mm and a thickness of 2 mm.

FIG. 2 shows the maximal and minimal values of flow current and indicates that the lower the flow current, the less is the high-frequency noise. As appreciated from this drawing, in the ferrite electrodes composed of the compositions comprising iron oxide, manganese oxide, cobalt oxide, zinc oxide, magnesium oxide, nickel oxide and iron oxide, denoted by Sample Nos. 1 to 8, the flow current stays at a high level of the order of 80–100 dB, indicating frequent occurence of high-frequency noise, even though using argon gas for the calcining atmosphere. On the other hand, the ferrite electrode composed of a composition of barium oxide and iron oxide, represented by Sample No. 9, exhibits a flow current level in the neighborhood of 70-75 dB, indicating reduced high-frequency noise. The ferrite electrode of Sample No. 8, which is composed of nickel oxide and iron oxide, shows the minimal flow current of 75 dB, which is close to the value given by the ferrite electrode of this invention, but this Sample No. 8 ferrite electrode induces the maximal flow current of as high as 113 dB. Thus, this electrode fluctuates widely in flow current and is unstable in its properties, so that it is practically unusable.

FIG. 3 shows the maximum and minimum values of discharge voltage. Obviously, the lower the discharge voltage, the less is the energy loss. The ferrite electrodes comprising the compositions of iron oxide, manganese oxide, cobalt oxide, zinc oxide, magnesium oxide, nickel oxide and iron oxide, indicated by Sample Nos. 1 to 8, exhibit a high discharge voltage, ranging from 4 to 12 kV, implying a high energy loss. On the other hand, the barium oxide-iron oxide ferrite electrode of this invention, referred to by Sample No. 9, produces a discharge voltage in the neighborhood of 1.8-2.8 kV, suggesting a reduced energy loss.

Figure 4:
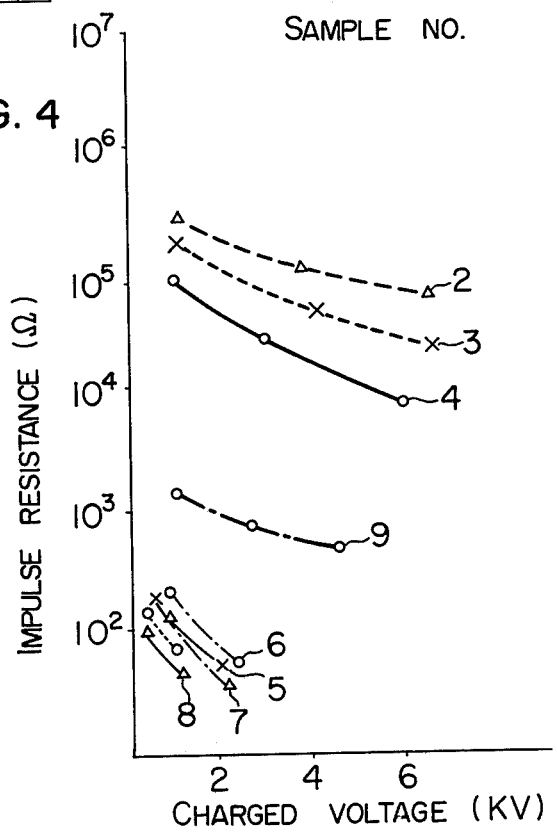
FIG. 4 is a graphic illustration of the relation between impulse resistance and charged voltage in the ferrite electrode according to this invention and in the conventional ones.

A further comparison is made by referring to FIG. 4 which shows the range of impulse resistance shown by the ferrite electrode of this invention as compared with those possessed by the conventional ferrite electrodes. The test materials used for this comparison were the same as those which were subjected to measurements by the measuring circuit of FIG. 1. In the graph of FIG. 4, charged voltage is plotted as abscissa and impulse resistance as ordinate on a logarithmic scale. As appreciated from this graph, the ferrite electrodes containing manganese oxide (Sample Nos. 2, 3 and 4) show high impulse resistance while the ferrite electrodes containing iron oxide (Sample No. 1) cobalt oxide (Sample No. 5), zinc oxide (Sample No. 6), magnesium oxide (Sample No. 7) and nickel oxide (Sample No. 8) demonstrate low impulse resistance, and as will be noted, the ferrite electrode containing barium oxide according to this invention shows a range of impulse resistance which is substantially intermediate between said high and low ranges of the conventional ferrite electrodes.

As viewed above, the ferrite electrode according to this invention can satisfy simultaneously the two essential requirements, that is, minimizing the energy loss and suppressing high-frequency noise when an electric current was applied to the ferrite electrode, as noted from the results of measurements shown in FIGS. 2 to 4.

In the shown embodiment of the invention, a mixture of FeO and $Fe_2O_3$ was used as iron oxide to be mixed with barium oxide, but $Fe_2O_3$ alone may be used as iron oxide. Also, the weight ratio of barium oxide which is mixed with iron oxide is 0.5 or less than half of the total weight. It is more preferable to use the mixture represented by the formula: $(BaO)_n \cdot (Fe_2O_3)_m$ or $(BaO)_n \cdot (FeO \cdot Fe_2O_3)_m$ wherein n is 0.6-1.0 and m is 0.8-1.2 in molar ratio and $FeO/Fe_2O_3$ being $\frac{1}{2}$-1/5.

In production of the ferrite electrode containing barium oxide according to this invention, first pulverized barium oxide and iron oxide are mixed and this mixture is calcined in an argon gas atmosphere at a temperature of 1100°-1200° C. Then the calcined product of barium oxide and iron oxide mixture is again pulverized and mixed up, and this mixture is again calcined in an argon gas atmosphere at a temperature of 1200°-1250° C. to complete a ferrite electrode. The reason that the calcined ferrite is again pulverized and mixed and again calcined is to minimize scatter of the maximal and minimal values of discharge voltage and flow current. The above described method can provide a ferrite electrode with stabilized properties.

Although argon gas was used for the calcination atmosphere in the above-shown embodiment of the invention, one may also use nitrogen gas. Basically, it is suggested to perform calcination in an inert gas atmosphere.

What is claimed is:

1. A ferrite electrode material consisting essentially of a calcined mixture of metal oxides of the formulation $(BaO)_n \cdot (Fe_2O_3)_m$ or $(BaO)_n \cdot (FeO \cdot Fe_2O_3)_m$, wherein n is 0.6 to 1.0 and m is 0.8 to 1.2 in molar ratio.

2. A ferrite electrode material according to claim 1, wherein said mixture of metal oxides is $(BaO)_n \cdot (Fe_2O_3)_m$, in which n is 0.6 to 1.0 and m is 0.8 to 1.2 in molar ratio.

3. A ferrite electrode material according to claim 1, wherein said mixture of metal oxides is $(BaO)_n \cdot (FeO \cdot Fe_2O_3)_m$, in which n is 0.6 to 1.0 and m is 0.8 to 1.2 in molar ratio and the molar ratio of $FeO/Fe_2O_3$ is $\frac{1}{2}$ to 1/5.

4. A ferrite electrode material according to claim 1, wherein the weight ratio of barium oxide is about 0.5 based on the total weight of barium oxide and iron oxide.

5. A ferrite electrode material according to claim 3, wherein $(BaO)_n \cdot (FeO \cdot Fe_2O_3)_m$ is $(BaO)_{0.8} \cdot (FeO)_{0.2} \cdot (Fe_2O_3)_{1.0}$.

6. A ferrite electrode material according to claim 1, wherein the calcined mixture is produced by calcining a pulverized mixture of barium oxide and iron oxide or iron oxides at a temperature of 1100°-1250° C. in an inert gas contaning less than 0.01 ppm of oxygen.

7. A ferrite electrode material according to claim 1, wherein the calcined mixture is produced by calcining a pulverized mixture of barium oxide and iron oxide or iron oxides at a temperature of 1100°-1200° C., pulverizing and mixing the calcined mixture, and re-calcining at a temperature of 1200°-1250° C., the calcining the re-calcining taking place in an inert gas containing less than 0.01 ppm of oxygen.

8. A ferrite electrode material according to claim 6 or 7, wherein the inert gas is argon.

9. A ferrite electrode material according to claim 1, wherein the calcined mixture is produced by calcining in an inert gas atmosphere containing less than 0.01 ppm of oxygen.

10. A ferrite electrode material according to claim 1, which consists of said calcined mixture.

* * * * *